United States Patent [19]

Stapper et al.

[11] Patent Number: 5,105,936
[45] Date of Patent: Apr. 21, 1992

[54] CHAIN-DRUM MECHANISM

[75] Inventors: Horst Stapper, St. Ingbert; Kunibert Becker, Werl, both of Fed. Rep. of Germany

[73] Assignee: Untertage Maschinenfabrik Dudweiler GmbH, Dudweiler/Saar, Fed. Rep. of Germany

[21] Appl. No.: 625,109

[22] Filed: Dec. 10, 1990

[30] Foreign Application Priority Data

Jan. 6, 1990 [DE] Fed. Rep. of Germany ....... 4000232

[51] Int. Cl.⁵ ............................................. B65G 23/06
[52] U.S. Cl. .................................... 198/834; 198/832
[58] Field of Search ............... 198/832, 834, 835, 729, 198/735.3, 860.1

[56] References Cited

U.S. PATENT DOCUMENTS

| | | | |
|---|---|---|---|
| 3,685,367 | 8/1972 | Dawson | 198/834 |
| 3,805,631 | 4/1974 | Kerklies | 198/834 X |
| 4,037,713 | 7/1977 | Soliman et al. | 198/834 X |
| 4,437,564 | 3/1984 | Redder et al. | 198/834 |

FOREIGN PATENT DOCUMENTS

| | | | |
|---|---|---|---|
| 1257669 | 7/1968 | Fed. Rep. of Germany | |
| 1481298 | 10/1969 | Fed. Rep. of Germany | |
| 2100885 | 7/1972 | Fed. Rep. of Germany | |
| 2327852 | 6/1973 | Fed. Rep. of Germany | |
| 2822175 | 11/1978 | Fed. Rep. of Germany | 198/834 |
| 2942916 | 5/1981 | Fed. Rep. of Germany | |
| 0540782 | 12/1976 | U.S.S.R. | 198/834 |
| 0606773 | 5/1978 | U.S.S.R. | 198/834 |
| 0725966 | 4/1980 | U.S.S.R. | 198/834 |
| 0848432 | 7/1981 | U.S.S.R. | 198/832 |

Primary Examiner—Robert P. Olszewski
Assistant Examiner—James R. Bidwell
Attorney, Agent, or Firm—Body, Vickers & Daniels

[57] ABSTRACT

Chain-drum drive or guidance mechanism in a machine frame of a chain-scraper conveyor, has a shaft (6) of its chain-drum (5), outer bearing parts (8) receiving shaft bearings (7), as well as sealing elements (24, 25) for sealing gaps between the outer bearing parts and the chain drum, all combined in a pre-assembled unit (12), which is fitted into, and removed from the machine frame (1) as a whole. The unit (12) is secured in the machine frame (1) preferably by clamp connections, in particular hydraulic annular clamps (31) or the like, which are seated in the openings (11) of the machine frame side walls (2, 3).

29 Claims, 5 Drawing Sheets

CHAIN-DRUM MECHANISM

The invention relates to a chain-drum drive mechanism in or for a machine frame of a chain-scraper conveyor.

Chain-drum conveyors are preferred as short- and long-haul conveyors in mining. There, chain-drums for drive and guidance, particularly returns, of the scraper-chain are mounted in machine frames, which are attached by their ends within a channel extrusion or the conveyor channel of the chain-scraper conveyor itself. The conveyor- or chain-drum drives respectively are laterally attached to the side walls of the machine frame. Chain-drums each comprising two screwed together semi-circular shells and carrying at least one chain-engaging sprocket are rotatably arranged on its own shaft, which is mounted in outer bearing parts that receive the shaft-bearings. The latter are arranged in openings of two side walls of the machine frame and connected to the machine frame by bolting so as to be releasable, or (in rare cases) by welding so as to be firmly attached. Sealing elements in the form of labyrinth seals and/or sealing rings or the like are provided as a dirt seals to circumferential gaps between the outer bearing parts and the chain-drums (DE-AS 12 57 669, DE-OS 14 81 298, DE-PS 21 00 885, DE-OS 23 27 852, DE-PS 29 42 916).

Chain-drum drive or guidance mechanisms, known in various forms for scraper conveyors, usually have to be assembled at the place of operation, including their components incorporating the chain-drum, the shaft as well as the outer bearing parts and shaft bearings and sealing elements, and they likewise have to be dismantled at the place of operation, for example in case of repairs. This requires high labour-costs and is time-consuming, and often results in ingress of dirt or damage to the bearing members. The chain-drums, which are liable to wear, are generally exchangeable without necessarily requiring removal of the entire shaft mounting including the outer bearing parts fitted in the machine frame. However, that still leaves substantial individual part assembly and dismantling, as well as pollution risks, at the places of operation of the chain-scraper conveyors.

It is an object of the invention to provide chain-drum drive and/or guidance mechanisms in machine frames of chain-scraper conveyors, including those of centre-chain and double-centre-chain-scraper conveyors which are predominant in mining, in such a manner that assembly and, for example in the case of repairs, dismantling are considerably simplified.

According to the invention there is provided chain-drum drive and/or guidance mechanism in a machine frame of a chain-scraper conveyor, comprising a shaft, a chain-drum supported by the shaft, shaft bearings to each side of the chain-drum, outer bearing parts receiving the shaft bearings, sealing elements arranged between the outer bearing parts and the chain-drum, the outer bearing parts being located in openings of side walls of the machine frame, means for releasably fixing the outer bearing parts to the side walls; the shaft, the outer bearing parts with shaft bearings therein and the sealing elements forming a preassembled unit insertable into and removable from the machine frame as a whole unit.

In embodiments of the invention the chain-drum as well as the shaft, the two outer bearing parts and related shaft bearings, as well as above-mentioned sealing elements, are combined to form a single pre-assembled unit, which can be installed into the machine frame as a whole, and which can also be removed from the machine frame as a whole whenever so required. This results in considerable simplifications in mounting and servicing chain-drum drive mechanisms. At the same time, ingress of foreign matter, and damage to the sensitive bearing members, as may occur during the assembly of individual parts at the place of operation of the chain-scraper conveyor, are reliably avoided. Whilst the chain-drum itself can be part of the mentioned assembly unit, it is advantageous for the chain-drum, to be removably linked to rotate with the shaft, in the familiar two-part manner, conveniently releasably connecting its two semi-circular shells by a screw arrangement or the like. This also allows a quick change of the chain-drum during operational use without having to remove and replace the whole chain-drum drive or guidance mechanism at the same time. The openings in the side walls of the machine frame, which receive the outer bearing parts, can also be dimensioned in such a way that the shaft-mounted chain-drum can be fitted into the machine frame, or removed from the machine frame as part of the pre-assembled assembly unit.

The chain-drum drive mechanism is a pre-assembled unit may resemble a mounting cartridge, and can be fitted into the machine frame after pre-assembly in the workshop, or removed from the frame. Preferably it can be used, due to advantageous symmetrical form of construction, both in righthand- and lefthand arrangements, i.e. selectively either with the chain-drum drive attached to the righthand- or the lefthand side, as well as for two-sided drives. The number of units to be kept in store for different applications can be reduced overall due to the basic pre-assembly relative to symmetrical machine frames, and due to the pre-assembly of the shaft- or chain-drum components of the bearing cartridge, particularly as righthand and lefthand arrangements of the drive sets no longer need to be kept in store. The system also permits dismantling of the chain-drum shaft with single sided drive without dismantling the gears. If required, pre-assembled units hereof can also be used for different conveyor types, in which respect it can be equipped with a suitable respective chain-drum or equivalent.

It is advantageous for the outer bearing parts to have an outside diameter which allows the assembly unit to be passed from both sides through the openings of the machine-frame side walls, including chain-engaging sprocket(s), allowing the entire assembly unit to be fitted into the machine frame selectively from either side, or to be removed selectively from either side of the machine frame. In the case of a single sided conveyor drive, that will generally be towards the side of the machine frame opposite the conveyor drive. Exchanging the assembly unit is thus possible without removal of the conveyor-drive gears, which are attached to the side wall. This brings about considerable advantages relative to maintenance and repairs in addition to the advantages in stocking parts.

Moreover, the outer bearing parts can be arranged to be of constant outside circumference at their outer ends facing away from the chain-drum over an extent corresponding to at least approximately the thickness of the side walls, in which respect they then can continue reduced in diameter towards end regions facing the chain-drum, preferably as conical tapering towards the chain-drum. Such conical surfaces constitute guide surfaces that make dismantling of the assembly unit from the machine frame easier. Also, the arrangement is preferably made in such a manner that outer ends of the outer bearing parts are substantially flush with outside surfaces of the two side walls of the machine frame, i.e. not laterally protruding beyond the side walls when assembled. This arangement also simplifies the attachment of gears to the side wall of the machine frame, particularly using a flange plate or the like secured to the side walls, if appropriate, to which the conveyor drive with gears is attached. Such a flange plate serves as a connecting member between the side wall of the machine frame and the gears of the conveyor drive, and is arranged so that different sizes and arrangements of gears can be attached. In this way, the number of mounting locations for different gear arrangements to be provided at the side walls of the machine frame is reduced.

It is also within the scope hereof to use quick-release couplings for fitting a pre-assembled chain-drum drive mechanism to the side walls of the machine frame. Particularly suitable for this are couplings which clamp the bearing pots of the assembly unit radially of the openings of the machine frame, further preferably thus also in the axial direction. In one preferred arrangement, hydraulically clamped connections are used, and can be of different constructions. For example, they can be hydraulic clamping cylinders which fix clamping members against the outer bearing parts when pressurised. In a preferred form of embodiment of an hydraulic clamp coupling, an annular clamp is used, which surrounds the respective outer bearing part, and is placed in the opening of the machine-frame side wall, and is expandable radially by introduction of pressure medium, then to press against the circumference of the outer bearing part. Then, the arrangement is such that clamping can be released by pressure-release at the annular clamp. An expandable hollow metal ring with cylindrical inside and circumferential surfaces can be used to advantage. By hydraulically pressure-loading the metal hollow ring, it is expanded radially to such an extent that it is fixed with its inner circumferential surface against the cylindrical circumferential surface of the outer bearing part, whilst supporting itself by its outer circumferential surface against the circumference of the opening of the side walls. It is useful for the openings at the side walls of the machine frame to be partially reduced in diameter to form an annular shoulder, so that the annular clamps laterally abut against the annular shoulders. The annular clamps can be placed into the openings of the side walls from inside the machine frame. In lieu of the annularly closed annular clamps, several hydraulically expandable annular segments can be spaced over the circumference of the bearing parts.

Instead of the preferred hydraulic clamp connections, mechanical clamp connections can be used, in particular wedge-operating clamp connections; in particular, wedge-clamping sets to be arranged in the openings of the side walls of the machine frame. The hydraulic or mechanical clamp connections are advantageously arranged so as to permit clamping and releasing from one location accessible from the outside in the assembled state of the chain-drum drive mechanism and with a laterally attached conveyor drive.

Specific implementation for embodiments of the invention will now be described by way of example with reference to the accompanying drawings, in which FIG. 1 is an exploded schematic view of a simplified chain-drum drive mechanism for a machine frame;

Figure 1:
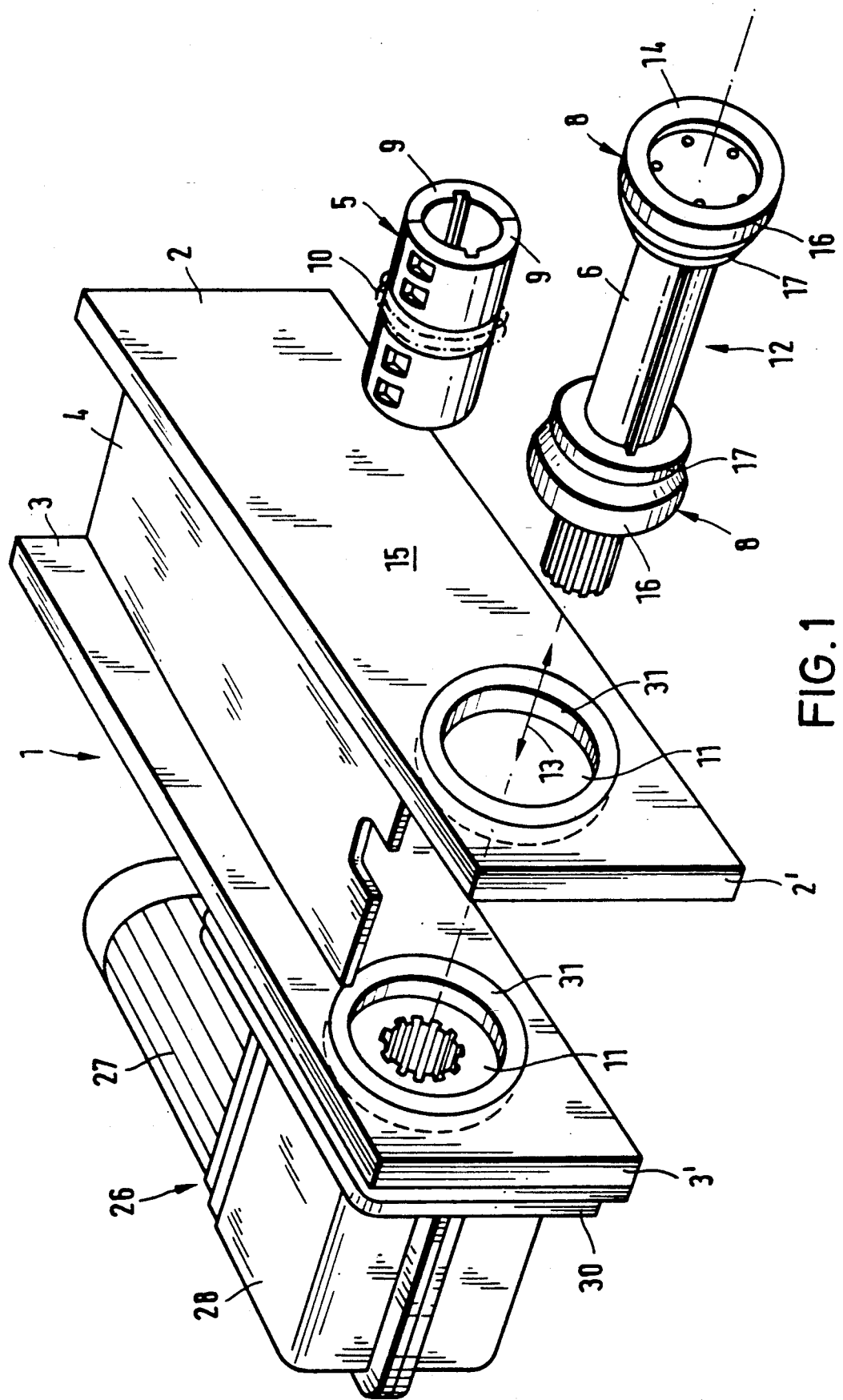

The machine frame 1 as shown in the drawing comprises, a known manner, two parallel, vertical side walls 2 and 3, which are connected by a welded-in conveyor bottom 4 and usually by further cross connections (not shown in the drawing), to form a stable, substantially distortion-free frame. A channel extrusion (not shown) of the chain-scraper conveyor is normally connected to the machine frame via a connecting channel bolted to the rear end of the machine frame. These arrangements are already known.

Figure 2:
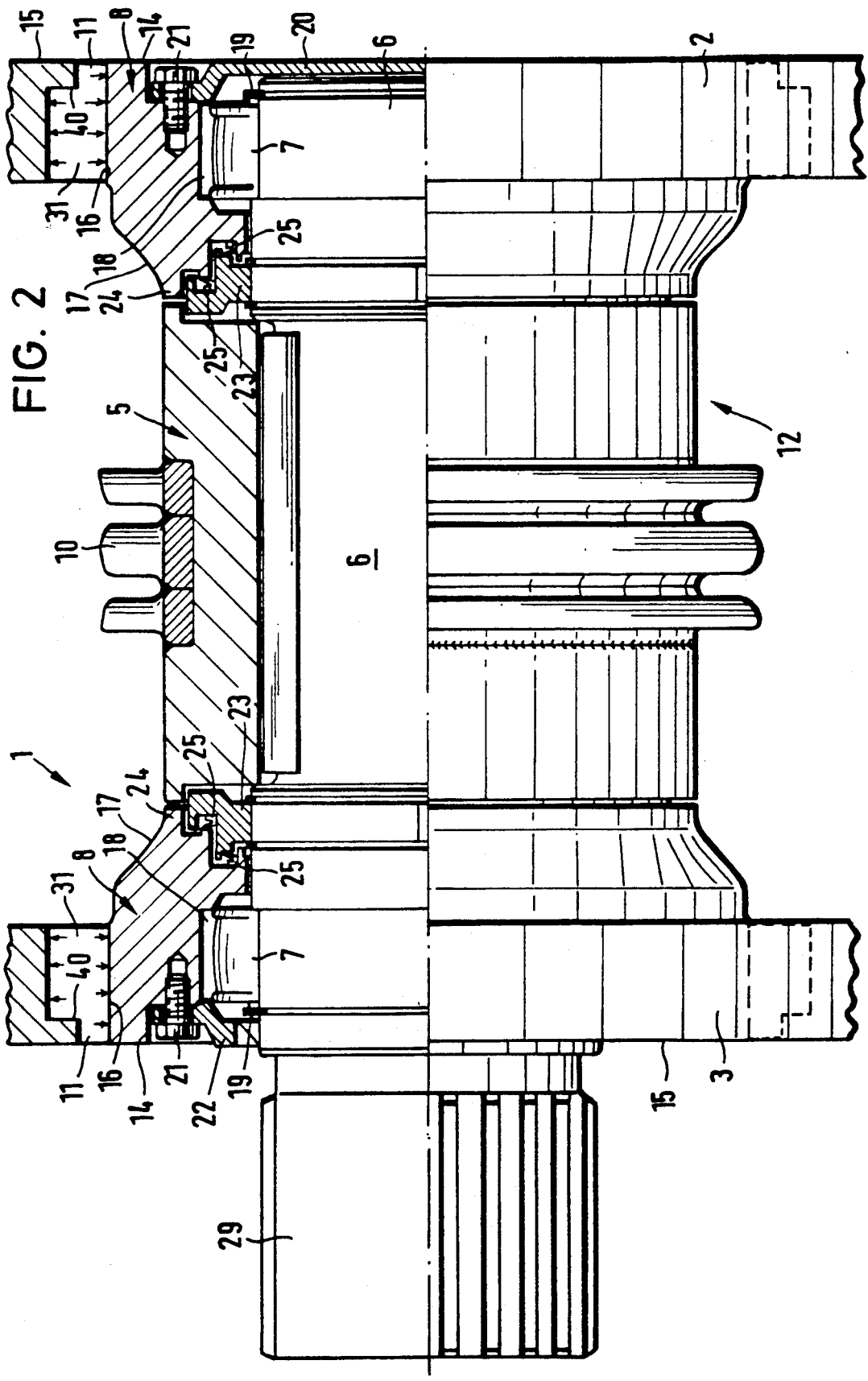
FIG. 2 shows details of the chain-drum drive mechanism of FIG. 1 in a front view of the machine frame, or in a vertical sectional view through same.

A chain-drum 5 is mounted between the vertical side walls 2 and 3 in a forward section of machine frame 1. The drum 5 is seated on a shaft 6, which is mounted by shaft inner bearing parts 7 in outer bearing parts 8. As is usual, the shaft bearings 7 are shown as roller bearings. The chain-drum 5 is shown comprising two semi-circular shells 9, which are releasably connected together by means of bolts, as is also already known. Non-rotatable connection between chain-drum 5 and shaft 6 is provided for in known manner, whether by detent spring connections or by tooth and counter-tooth arrangements for shaft 6 and the semi-circular shells 9 of chain-drum 5. The non-rotatable connection can be released so that, between the two outer bearing parts 8, and the chain-drum is generally both rotatably and exchangeably arranged on shaft 6. The chain-drum 5 has at least one chain sprocket 10 for drive and guidance of an endless scraper-chain belt (not illustrated) of the scraper-chain conveyor. In FIG. 1, the chain sprocket 10 is positioned substantially at the middle of chain-drum 5. In FIG. 2, it is arranged as a double chain sprocket, and accordingly serves to drive and/or guide the scraper-chain belt of a central double-chain scraper conveyor.

The two side walls 2 and 3 of machine frame 1 each have a circular opening 11, their diameters being larger than the diameter of outer bearing parts 8, even larger than the diameter of the chain sprockets 10 if desired. Shaft 6, the two outer bearing parts 8 together with inner shaft bearing parts 7, as well as associated sealing elements, and, if desired, chain-drum 5, can be built as a pre-assembled unit 12, for entry complete from one or other side into the machine frame 1, or removed whenever required, for example for repairs. Such entry and removal are indicated by a double arrow 13 in FIG. 1. The built-up state of assembly unit 12 is shown in FIG. 2. The two outer bearing parts 8 have an outside diameter which allows them to be pushed from either side through the openings 11 in side walls 2 and 3. In the built-up state, as in FIG. 2, outer bearing parts 8 are disposed in openings 11 in such a manner that their outer end faces 14 are approximately flush with the outside surfaces 15 of the side walls 2 and 3, or at least not protruding beyond the outside surface 15.

In particular, FIG. 2 shows two outer bearing parts 8 that are constantly cylindrical in their outside circumferences from their outer sides 14 (facing away from chain-drum 5) for at least half the thickness of side wall 2 or 3, actually shown as being for all of such thickness. That cylindrical circumferential part is marked 16. Towards their other sides (facing the chain-drum 5), the two outer bearing parts 8 are reduced to the diameter of chain-drum 5, including a conically portion tapering towards chain-drum 5, as is shown at 17. Shaft bearing parts (shown complete with rollers) are seated in counter-bores 18 of outer bearing parts 8. Axial connection of the shaft 6 to the two outer bearing parts 8 is achieved by means of fixing elements 19, such as spring rings located in grooves of the shaft. At one end, shaft bearing 7 is secured in one outer bearing part 8 by means of a cover plate 20 set in a counter-bore at outer side of the relevant bearing part 8 and releasably fixed by means of axial bolts 21. At the other end of the drive, provision is made for a sealing ring 22, which surrounds the shaft 6 and is also fixed to relevant bearing part 8 by means of axial bolts 21. Shaft 6 and the two outer bearing parts 8 together with shaft bearings 7 are connected to the pre-assembled unit 12 via fixing elements 19, such as spring rings.

Circumferential gaps between the two end faces of chain-drum 5 and the inner sides of outer bearing parts 8 are protected against ingress of foreign material by sealing elements. As shown, annular elements 23 seated on the shaft 6 and fixed in the axial direction thereto, for example by fixing elements, such as spring rings, are located between chain-drum 5 and the two outer bearing parts 8. These annular elements 23 are of metal and form a labyrinth seal 24 relative to each of the two outer bearing parts 8. Further sealing elements 25 can be provided between the annular elements 23 and the outer bearing parts 8, which faces are shown stepped several times towards the labyrinth seals. Annular elements 23 and sealing elements 25 are part of the pre-assembled unit 12.

A conveyor- or chain-drum drive 26, comprising an electric drive motor 27 and a gear 28, is shown externally mounted to side wall 3 of the machine frame 1. Shaft 6 is shown with a splined end 29 going through the relevant opening 11 of side wall 3 and beyond into an internally splined output shaft of the gear 28. As is shown in FIG. 1, a flange plate 30 can also be connected to side wall 3 on the drive-side of the machine frame 1, for example by means of threaded bolts, and with conveyor drive 26 and its gear 28 suitably flange-mounted thereto. With conveyor drive 26 attached, the cartridge-shaped assembly unit 12 can be entered from the opposite side of the machine frame 1 via the openings 11 in side walls 2 and 3, and it can be removed towards the same side without necessitating separation of gear 28 from the machine frame.

Figure 3:
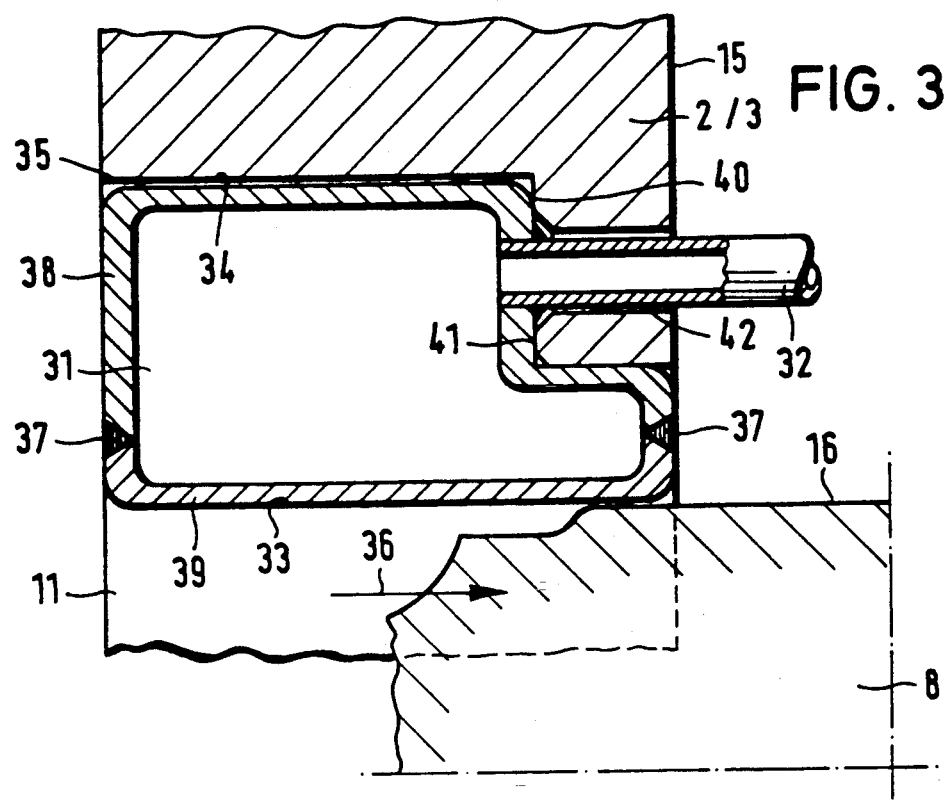
FIGS. 3 and 4 show an hydraulic clamping device to fix the assembly unit to the machine frame, cross-sectionally through annular clamps in an hydraulically unloaded state (FIG. 3), and in an hydraulically clamped state (FIG. 4)
Figure 4:
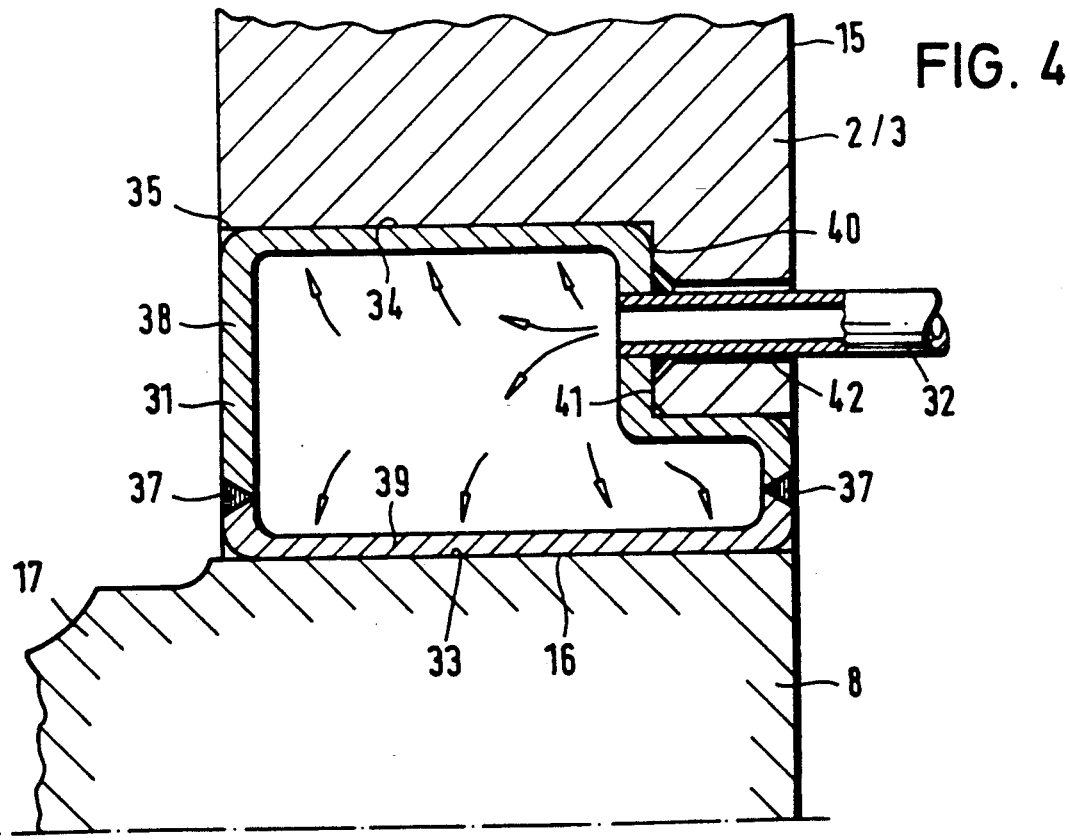

In its built-up state, the assembly unit 12 is fixed to the two outer bearing parts 8 in openings 11 of machine frame side walls 2 and 3. This is done, in preferred embodiments, on each of the two side walls 2 and 3, by means of an annular clamp 31 of expandable type placed in respective opening 11 and going about the relevant outer bearing part 8 over its cylindrical area 16. The annular clamps 31 can be hydraulically clamped by introducing high-pressure hydraulic medium by way of hydraulic connections 32 (FIGS. 3 and 4). By introducing the high-pressure medium, the annular clamps 31 expand radially inwardly against cylindrical inner circumferential surfaces 33 of the cylindrical surfaces 16 of the outer bearing parts 8, and outwardly at circumferential surfaces 34 against the cylindrical circumferential surfaces of the openings 11. Thus, outer bearing parts 8, and with them the entire assembly unit 12, are firmly clamped radially into openings 11 of side walls 2 and 3 of machine frame 1, and in consequence also firmly clamped in the axial direction, as is indicated in FIG. 2 by radial arrows 40. Thus, a firm, immovable mounting of assembly unit 12 in side walls 2 and 3 of machine frame 1 is guaranteed. Said clamping can be released by releasing pressure in both annular clamps 31 (FIG. 3), so that the entire assembly unit 12 can be removed laterally from openings 11 of machine-frame side walls 2 and 3, as is indicated in FIG. 3 by arrow 36. Relief valves for pressure relief of the annular rings and for releasing the clamping connection can be arranged at connections 32 of the hydraulically expandable annular clamps 31. They are not illustrated in the drawing.

As can be seen in FIG. 3 and 4, the two annular clamps 31 can be made of hollow metal rings, manufactured of two annular sections 38 and 39, which are welded together at 37. The openings 11 on the two side walls 2 and 3 are shown reduced in diameter to forming annular shoulders 40, against which the correspondingly reduced annular clamp 31 locates laterally by its side surface 41. The width of annular clamps 31 otherwise corresponds to the thickness of side walls 2 and 3. As is shown in FIG. 2, the annular clamps 31 can be entered from the inside of the machine frame walls 2 and 3 into the openings 11, similarly, if required, removed from openings 11 towards the inside of the machine frame. The connections 32 are advantageously located at the sides of annular rings 31 facing chaindrum 5 rather than in radial arrangement relative to the annular clamps. They pass through passages 42 of side walls 2 and 3. Deviating from the description of FIG. 3 and 4, the arrangement can advantageously be such that the connections 32 do not protrude past insides of the side walls 2 and 3, say arranged so as to end at faces of the side walls 2 and 3.

Instead of using the aforedescribed one-piece annular rings 31, the assembly unit 12 can be fixed in the machine frame 1 by a hydraulic clamp connection with several hydraulically expandable annular segments, which are seated in openings 11 of the side walls and which are expandable by hydraulic pressure application against the bearing parts 8, so that these are firmly clamped in the openings 11. Mechanical clamp connections, conveniently rising wedge-clamping elements, can be provided in place of hydraulic clamp connections.

Figure 5:
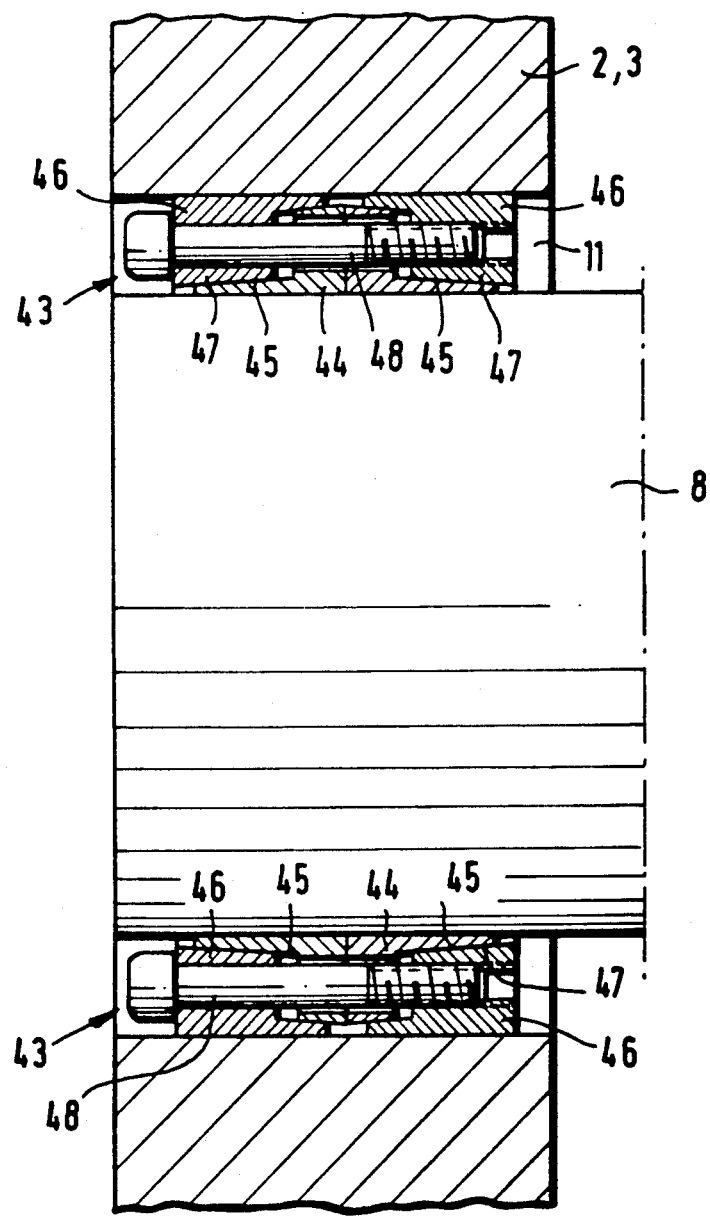
FIGS. 5 and 6 show two examples of mechanical clamping device in vertical cross-section through side walls of the machine frame.

In FIG. 5, the cartridge-shaped assembly unit 12 is clamped in the openings 11 of the side walls 2 and 3 of the machine frame with the aid of wedge-clamp sets 43, seated in said openings and with their clamping members 44 being provided with axially extending conical surfaces 45, against which abut clamping segments 46 with cooperating conical surfaces 47. These clamping segments 46 support themselves with their cylindrical outer surfaces against the cylindrical circumferential surface of openings 11 of the side walls 2 and 3. Clamping is achieved by means of axial clamp screws 48, which reach through bores of the clamping members and the clamping segments, and which are screwed into threaded bores of the clamping segments by their thread ends. By tightening clamping screws 48, clamping segments 46, which are arranged in pairs, are pulled towards one another, thereby wedging clamping members 44 against the cylindrical circumferential surfaces of bearing parts 8. The latter have conical surfaces 45 with inclinations towards one another, against which clamping segments 46 support themselves by the cooperating conical surfaces 47.

Figure 6:
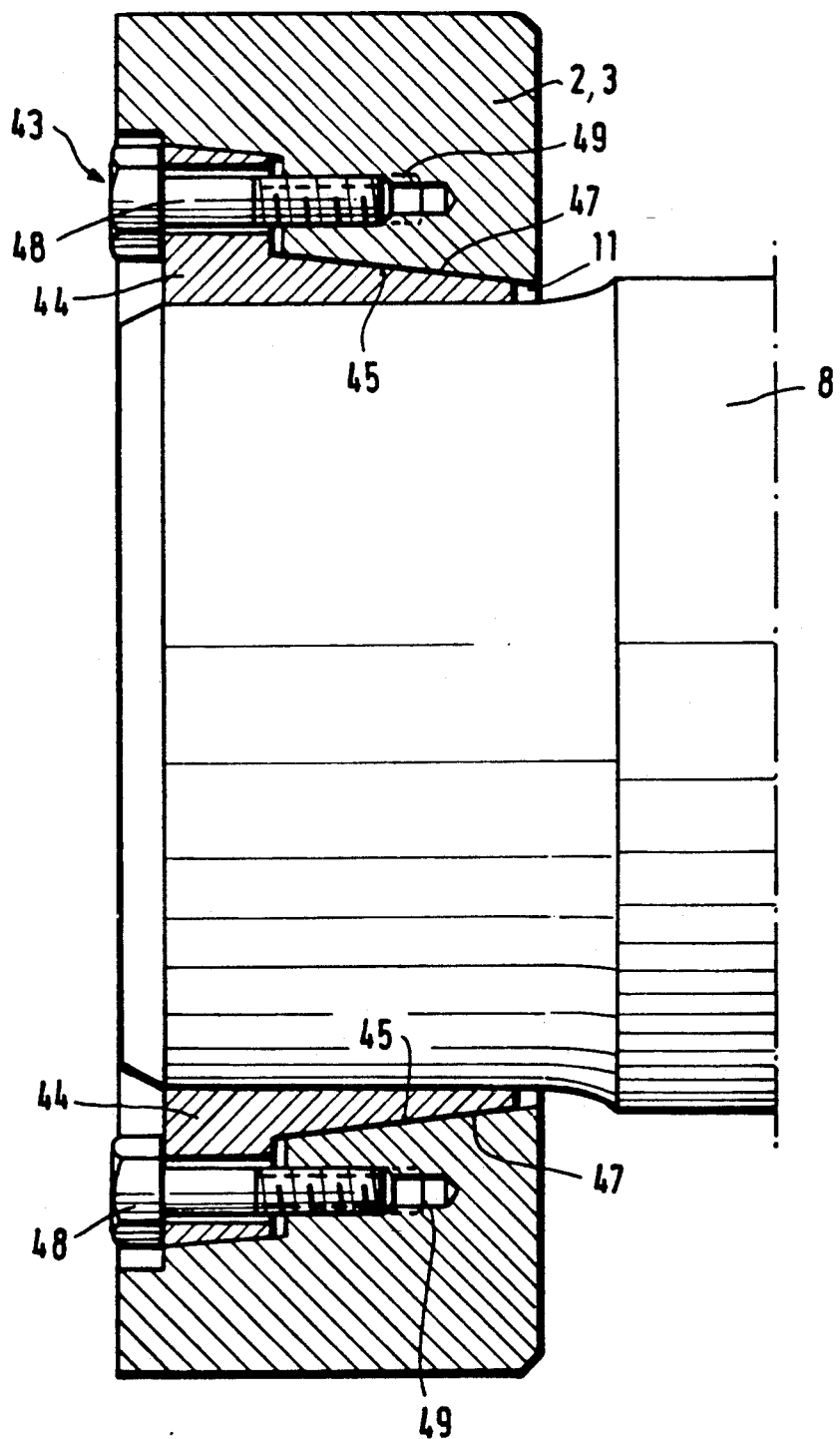

Turning to FIG. 6, clamping members 44 support themselves with their conical surface 45 against conical surfaces 47, which is offered circumferences of the openings 11 of the side walls 2 and 3. Axial clamping screws 48 pass through bores of clamping members 44 and are screwed into threaded bores 49 of the side walls. By tightening the clamping screws 48, the outer bearing parts 8 are firmly clamped in the openings 11 of the side walls 2 and 3. Feasibly, the conical surfaces 47 can alternatively be afforded by inserts seated in the openings 11 of the side walls 2 and 3.

When using wedge-clamping sets, clamping means other than axial clamping screws 48 can be used, if appropriate even smaller hydraulic clamp cylinders or the like.

Suitable machine frame structures for chain-drum drive mechanisms as herein, are advantageously of a symmetrical construction to the extent of providing its side-wall openings (11) accommodating some form of clamp connections. It is advantageous to be able to use a flange plate (30) at one or the other side wall, depending on whether the conveyor drive (26) is installed at the left or the right side wall. As mentioned earlier, such a flange plate (30) serves as a connecting member between the machine frame and a respective direct gear (28), can be constructed to allow the connection of gears of different sizes and forms. Particularly preferred are machine frames suitable for drives on both sides (due to symmetric construction). In the event of repairs, entire assembly units (12) can be removed from machine frame (1) as a sealed unit, and replaced quickly by a new unit.

At least for low-level machine frames, openings (11) in side walls (2 and 3) may be dimensioned such that cartridge-shaped assembly units (12) can be fitted into the machine frame, or removed from same, only with chain-drum (5) removed. The cartridge-shaped assembly unit (12) then constitutes a drive- and bearing unit which can be fitted with different chain drums (5) as required.

We claim:

1. A chain-drum drive/guidance mechanism in a machine frame of a chain-scraper conveyor, said frame having two side walls each side wall having an opening; said chain-drum drive mechanism comprising a shaft, a chain-drum supported by said shaft, two shaft bearings, one disposed on each side of the chain-drum, two outer bearing parts, one of said outer bearing parts receiving each said shaft bearings, sealing elements arranged between each said outer bearing parts and said chain-drum, said outer bearing parts being received in said openings of said side walls of the machine frame, clamp connections for releasably fixing the outer bearing parts in said openings in the side walls; the shaft, the outer bearing parts with shaft bearings therein and the sealing elements forming a preassembled unit insertable into and removable from the machine frame as a whole unit and wherein the pre-assembled units are retained by said clamp connections operative between the outer bearing parts and the openings of the side walls, said clamp connections being of the hydraulically operated type.

2. Chain-drum/guidance mechanism according to claim 1, each clamp connection comprises an annular clamp fitting in the opening of the respective machine frame side wall and about the respective outer bearing part, the annular clamp being expandable radially by the introduction of hydraulic pressure medium, and means for selectively releasing hydraulic pressure in the annular clamp.

3. Chain-drum drive/guidance mechanism according to claim 2, wherein each of the annular clamps comprises a hollow metal ring with cylindrical outermost and innermost circumferential surfaces.

4. Chain-drum drive/guidance mechanism according to claim 2, wherein the openings of the side walls of the machine frame each have reduced diameter portions forming an annular shoulder against which the annular clamps are located.

5. Chain-drum drive/guidance mechanism according to claim 2, wherein each of the annular clamps comprises plural hydraulically expandable annular segments.

6. Chain-drum drive/guidance mechanism according to claim 1, comprising hydraulic connections for the hydraulic clamp connections arranged at sides of the machine frame.

7. A chain-drum drive/guidance mechanism in a machine frame of a chain-scraper conveyor, said frame having two side walls each side wall having an opening; said chain-drum drive mechanism comprising a shaft, a chain-drum supported by said shaft, two shaft bearings, one disposed on each side of the chain-drum, two outer bearing parts, one of said outer bearing parts receiving each said shaft bearings, sealing elements arranged between each said outer bearing parts and said chain-drum, said outer bearing parts being received in said openings of said side walls of the machine frame, clamp connections for releasably fixing the outer bearing parts in said openings in the side walls; the shaft, the outer bearing parts with shaft bearings therein and the sealing elements forming a pre-assembled unit insertable into and removable from the machine frame as a whole unit and wherein said pre-assembled units are retained by said clamp connections operative between the outer bearing parts and the openings of the side walls and the clamp connections comprise wedge clamping sets arranged in the openings of the side walls.

8. Chain-drum drive/guidance mechanism according to claim 7, wherein each of the wedge-clamping sets comprises at least one clamp member having tapered a surface to engage cooperating tapered surfaces of another member.

9. Chain-drum drive/guidance mechanism according to claim 8, having plural said clamping members clamped by means of axial clamping bolts.

10. Chain-drum drive/guidance mechanism according to claim 7, wherein the other member comprises a circumferential surface of the respective one of the openings of the side walls.

11. Chain-drum drive/guidance mechanism according to claim 7, wherein the other member comprise plural clamping segments located against circumferential surfaces of the openings of the side walls.

12. A modular chain-drum drive for a chain conveyor comprising:
    a machine frame having two frame side walls with openings in each of said side walls, said openings being axially aligned and having a side wall opening size;
    two releasable clamping means, one of said two within each said side wall openings, said clamping means having clamping means openings, said clamping means openings having an opening size; and, a drum unit comprising a shaft having an axis, two shaft bearings disposed on said shaft, a chain-drum supported on said shaft between said shaft bearings, two outer bearing parts receiving said shaft bearings and being received in said clamping means openings and sealing elements between said chain drum and said outer bearing parts; said drum unit having a maximum cross-sectional size perpendicular to said axis smaller than said side wall opening size and said clamping means opening size whereby said drum unit is adapted to be removable as a unit from said drive through one of said side wall openings.

13. The chain-drum drive of claim 12 wherein said clamping means openings are generally cylindrical and said outer bearing parts have a generally cylindrical outer surface received in said clamping means opening.

14. The chain-drum drive of claim 13 wherein said outer bearing parts additionally comprise conical outer surfaces tapering from said outer bearing parts generally cylindrical surface inwardly and toward said drum.

15. The chain-drum drive of claim 12 wherein each said side wall has an outer surface and each said outer bearing parts has an outside end face, said outside end faces being generally planar and generally perpendicular to said shaft axis, said end faces being generally co-planar with said side wall outer surfaces.

16. The chain-drum drive of claim 12 additionally comprising fixing means adapted to retain said outer bearing parts on said shaft.

17. The chain-drum drive of claim 12 wherein said chain-drum comprises two half cylindrical drum elements releasably connected together around said shaft and said drum is non-rotatably fixed to said shaft.

18. The chain-drum drive of claim 12 wherein said drum unit additionally comprises a chain engaging sprocket mounted on said drum and having a cross-sectional size perpendicular to said axis smaller than said side wall opening size and said clamping means opening size.

19. The chain-drum drive of claim 12 wherein said shaft extends outwardly through one of said side wall openings and is adapted to engage a drive.

20. The chain-drum drive of claim 12 wherein said clamping means are hydraulically operated.

21. The chain-drum drive of claim 20 wherein each said clamping means comprises a radially expandable annular clamping element including means for selectively increasing and releasing hydraulic pressure in said element.

22. The chain-drum drive of claim 21 wherein each said annular clamping element is an annular hollow metal tube having a cylindrical outermost surface and a cylindrical innermost surface.

23. The chain-drum drive of claim 21 wherein each of said side wall openings comprises a first portion having said side wall opening size, a second portion having an enlarged size and an annular shoulder between said first portion and said second portion.

24. The chain-drum drive of claim 20 wherein said side walls have axially facing surfaces and said means for selectively increasing and releasing hydraulic pressure comprise hydraulic connections outwardly facing from said sidewall axially facing surfaces.

25. The chain-drum drive of claim 12 wherein said clamping means is mechanical.

26. The chain-drum drive of claim 25 wherein each said clamping means comprises a first conical surface co-axial with said shaft, a second conical surface co-axial with said shaft interior of and in abutment with said first conical surface and clamping connector means adapted to urge said second conical surface into wedging engagement with said first conical surface whereby said clamping means engages said drum unit outer bearing parts.

27. The chain-drum drive of claim 26 wherein each said first conical surface is on one of said side walls.

28. The chain-drum drive of claim 26 wherein each said first and second conical surfaces are on collars separate from said side walls.

29. The chain drum drive of claim 26 wherein said clamping connector means is bolts.

* * * * *